United States Patent [19]

Ritter, II

[11] Patent Number: 4,545,924

[45] Date of Patent: * Oct. 8, 1985

[54] PRODUCTION OF A MAGNESIUM CHLORIDE GEL SYSTEM USEFUL IN CERAMICS AND FIBER PRODUCTION

[75] Inventor: George W. Ritter, II, Newark, Ohio

[73] Assignee: Owens-Corning Fiberglas Corporation, Toledo, Ohio

[*] Notice: The portion of the term of this patent subsequent to Apr. 23, 2002 has been disclaimed.

[21] Appl. No.: 503,948

[22] Filed: Jun. 13, 1983

[51] Int. Cl.$^4$ .................. B01J 13/00; B28B 7/28; B28B 7/32; C07G 1/00

[52] U.S. Cl. .................. 252/315.7; 252/313.1; 252/309; 106/38.35; 106/287.17; 501/109

[58] Field of Search ............... 252/313 R, 315.7, 309, 252/313.1; 106/38.35, 287.17

[56] References Cited

U.S. PATENT DOCUMENTS

| | | | |
|---|---|---|---|
| 2,607,658 | 8/1952 | Govett | 252/317 |
| 2,773,839 | 12/1956 | Stover | 252/315.7 X |
| 2,900,349 | 8/1959 | Schwartz | 252/317 |
| 2,955,915 | 10/1960 | Bicek | 252/315.7 |
| 3,105,053 | 9/1963 | Cramer | 252/313 |
| 3,555,146 | 1/1971 | Jones | 424/47 |
| 3,855,147 | 12/1974 | Granquist | 106/287.17 X |
| 3,876,758 | 4/1975 | Beekman | 424/47 |
| 3,895,956 | 7/1975 | Yoshida | 106/287.17 X |
| 3,966,996 | 6/1976 | Andre | 423/626 |
| 4,017,599 | 4/1977 | Rubino | 424/47 |
| 4,089,692 | 5/1978 | Toeniskoetter | 106/38.35 |
| 4,196,011 | 4/1980 | Koike | 106/38.2 |
| 4,211,667 | 7/1980 | Yamada | 252/313 R |
| 4,333,846 | 6/1982 | Lee | 252/184 |
| 4,342,664 | 8/1982 | Blome | 252/313 R |
| 4,354,872 | 10/1982 | Kekish | 252/309 X |

FOREIGN PATENT DOCUMENTS

| | | | |
|---|---|---|---|
| 138960 | 2/1948 | Australia | 106/38.35 |
| 542257 | 6/1957 | Canada | 252/315.7 |
| 594671 | 11/1947 | United Kingdom | 106/38.35 |

*Primary Examiner*—Richard D. Lovering
*Assistant Examiner*—Catherine S. Kilby
*Attorney, Agent, or Firm*—Ronald C. Hudgens; Robert F. Rywalski; John C. Smith

[57] ABSTRACT

A method of preparing a magnesium and aluminum complex containing about 98 weight percent $Al_2O_3$ and about 2 weight percent MgO, which complex can be employed to produce ceramics and drawn fibers.

5 Claims, No Drawings

PRODUCTION OF A MAGNESIUM CHLORIDE GEL SYSTEM USEFUL IN CERAMICS AND FIBER PRODUCTION

This invention relates to the production of magnesium chloride-containing gel systems useful in ceramics.

In one of its more specific aspects, this invention relates to the production of a $MgCl_2.6H_2O$ containing hydrogel system useful as a ceramic binder, a ceramic molding material and for the formation of ceramic fibers.

The formation of gels is well known. Recently, there have been developed a series of gels which have proved suitable for the formation of fibers. Such gels are advantageously prepared at low temperatures and can usually be prepared easily and inexpensively.

There has now been discovered a magnesium chloride-containing gel which also contains aluminum oxide. As a result, there is produced a gel which has good ceramic characteristics and has a crystalline system of advantageous crystal size.

STATEMENT OF THE INVENTION

According to this invention, there is provided a method of preparing a magnesium and aluminum containing gel which comprises forming a first complex by mixing magnesium chloride and an aluminum-organo complex, and removing water from the complex to form the magnesium and aluminum containing gel.

In one embodiment of the invention, the gel is heated to elevated temperatures to enhance the fiber-forming properties of the gel.

In another embodiment of the invention polyvinyl alcohol is added to the gel to improve its fiber-forming processing.

DESCRIPTION OF THE INVENTION

The gel can be produced using any magnesium chloride salt. Preferably, the magnesium salt will be in the form of the chloride hexahydrate and will be employed in an amount within the range of from about 1.25 to about 5 weight percent of the aqueous gel.

The gel can be produced employing any aluminum organic complex. Preferably, an aluminum chloride organic complex such as aluminum chlorohydrate-propylene glycol complex containing about 36 percent equivalent weight aluminum oxide and about 12.5 weight percent chlorine will be used. One suitable complex is Rehydrol II ® which is an aluminum chlorohydrate-propylene glycol complex containing about 36 percent equivalent weight $Al_2O_3$ and 12.5 percent by weight chlorine and produced by Reheis Chemical. The aluminum organic complex is employed in an amount within the range of from about 62 to about 65 parts by weight of the gel.

If polyvinyl alcohol is employed, it is added at levels up to about 0.2 weight percent. Preferably, the polyvinyl alcohol will display a viscosity of 28–32 centipose in a 4% solution at 20%, e.g. Vinol TM 125 as produced by Air Products Corporation.

In the preferred method of carrying out the invention, the gel is prepared by mixing 35 to 100 g $MgCl_2.6H_2O$ in about 675 g water. To this is added from about 3 to about 10 cc of concentrated HCl (about 1.29 to about 4.48 g hydrogen chloride) and, with stirring, 1275 g Rehydrol. The resulting slurry is distilled under reduced pressure (200 mmHg/bp 70°–85° C.) with stirring to remove typically 140 to 160 g water. The gel precursor thus formed can then be stored at from 25° to about 40° C. for up to about 14 days, typically 4 to 5 days, to obtain a viscosity of about 150 poise at 50° to 60° C. at which it is suitable for fiber formation.

If the complex is fired to produce a ceramic material, it is fired at about 400° F. for about 1 hour, then at 1400° F. for about 1 hour and then at about 1950° F. for about 1 hour after which the residue is cooled in the furnace or in air. As is known, the time required at the various temperatures will depend upon the thickness of the body.

The following examples demonstrate suitable methods of carrying out the invention.

EXAMPLE I

A mixture was prepared employing 38 g $MgCl_2.6H_2O$, 565 g water, 110 g Vinol 125 solution (1% by weight polyvinyl alcohol) and 3 ml. conc. HCL. 1275 g Rehydrol II was added with stirring.

The resulting mixture was deaerated under vacuum and distilled under reduced pressure to remove 140 g water.

1749 g of gel was recovered and stored at 40° C. for 8 days.

Fibers were formed employing a spinnerette at 200 psig and 105° F. Composition of the fibers was about $Al_2O_3$: 98.4 weight percent,
MgO: 1.6 weight percent.

These fibers were not analyzed but the range of compositions should be within 95–98% $Al_2O_3$, 1–1.5% MgO, 0.5–4% carbon, chlorine and "others".

These data demonstrate the making of the magnesium chloride containing gel system of the invention and demonstrate that the system can be used to produce fibers.

EXAMPLE II

In order to form a composition which thickens more rapidly, the following procedure was followed.

A mixture was prepared employing 100 $MgCl_2.6H_2O$, 110 g Vinol solution (1.2 wt. percent Vinol 125) 565 g water and 3 ml. conc. HCL. To the resulting mixture was added 1275 g Rehydrol.

The resulting mixture was deaerated and then distilled under a pressure of 200 mm HG to remove 160 g water.

1781 g of product were recovered which were stored at 40° C. for 3 days.

The material was fired at 1950°–2700° F. to produce a ceramic material containing about 95.9 weight percent $Al_2O_3$ and 4.1 weight percent MgO.

It will be evident from the foregoing that various modifications can be made to this invention. Such, however, are considered within the scope of the invention.

I claim:

1. A method of preparing a magnesium and aluminum-containing gel suitable for forming fibers comprising:
   (a) forming an aqueous gel by mixing an aqueous solution of magnesium chloride hexahydrate and an aluminum chlorohydrate-propylene glycol complex in contact with hydrochloric acid, said magnesium chloride hexahydrate being present in an amount of from 35 to 100 parts by weight per 675 parts by weight of water, said aluminum chlorohydrate-propylene glycol complex being present in an amount within the range of from about 62 to about 65 parts by weight of said aqueous gel, and the hydrogen chloride in said hydrochloric acid being present in an amount of from about 1.29 to about 4.48 parts by weight per said 675 parts by weight of water;

(b) removing water from said aqueous gel under reduced pressure; and (c) storing the gel from step (b) at 25° C. to 40° C. for up to about fourteen days to obtain a gel having a viscosity of about 150 poise at 50° C.

2. The method of claim 1 in which said magnesium chloride hexahydrate is employed in an amount within the range of from about 1.25 to about 5 weight percent of the aqueous gel.

3. The method of claim 2 in which said aluminum chlorohydrate-propylene glycol complex contains about 36 percent equivalent weight aluminum oxide and about 12.5 weight percent chlorine.

4. The method of claim 3 in which said hydrochloric acid is concentrated hydrochloric acid employed in an amount of from about 3 to about 10 cubic centimeters per 35 to 100 grams of said magnesium chloride hexahydrate.

5. The method of claim 3 in which the gel is deaerated prior to the removal of water under reduced pressure.

* * * * *